US00RE47931E

(19) United States
(12) Reissued Patent
Li

(10) Patent Number: US RE47,931 E
(45) Date of Reissued Patent: Apr. 7, 2020

(54) BALL JOINT ORIENTATION DEVICE APPLICABLE TO UNIPOD

(71) Applicant: Guangdong Sirui Optical Co., Ltd., Zhongshan (CN)

(72) Inventor: Jie Li, Zhongshan (CN)

(21) Appl. No.: 15/951,162

(22) Filed: Apr. 11, 2018

Related U.S. Patent Documents

Reissue of:
(64) Patent No.: 9,309,920
Issued: Apr. 12, 2016
Appl. No.: 13/967,258
Filed: Aug. 14, 2013

(30) Foreign Application Priority Data

Jun. 28, 2013 (CN) ..... 2013 1 0266409

(51) Int. Cl.
*F16C 11/06* (2006.01)
*F16C 11/10* (2006.01)
(Continued)

(52) U.S. Cl.
CPC ..... *F16C 11/0623* (2013.01); *F16C 11/106* (2013.01); *F16M 11/2078* (2013.01); *F16M 11/28* (2013.01); *G03B 17/561* (2013.01); *F16M 2200/022* (2013.01); *Y10T 403/32311* (2015.01); *Y10T 403/32754* (2015.01)

(58) Field of Classification Search
CPC ..... F16C 11/0623; F16C 11/1061; F16M 11/2078; F16M 11/28; F16M 2200/022; G03B 17/561; Y10T 403/32311; Y10T 403/32754
See application file for complete search history.

(56) References Cited

U.S. PATENT DOCUMENTS 1,532,195 A 4/1925 Morrison
2,219,169 A 10/1940 Alter
(Continued)

FOREIGN PATENT DOCUMENTS

CA 2226465 A1 7/1999
CN 201373969 Y 12/2009
CN 201621438 U 11/2010

OTHER PUBLICATIONS

First Office Action issued Apr. 21, 2015, by the Taiwan Patent Office in corresponding Taiwan Patent Application No. TW-102142246, with English translation (8 pages).
(Continued)

*Primary Examiner* — William C Doerrler
(74) *Attorney, Agent, or Firm* — Loeb & Loeb LLP

(57) ABSTRACT

A ball joint orientation device applicable to a unipod includes a ball joint and stop members, in which one end of the ball joint is formed as a rotating part and is arranged in a ball joint seat in a universal swaying manner, and the other end extends to form a connecting part and is fixedly connected with a main rod; the stop members are arranged in the ball joint seat, and include a locking stop member located at the upper side of the rotating part; an orientation knob is sleeved on the connecting part and/or the main rod; when screwed toward the direction close to the ball joint seat, the ball joint is subjected to orienting locking and no longer rotates; and when screwed toward the direction away from the ball joint seat, and the orienting locking is released, so the ball joint is rotatable freely.

4 Claims, 4 Drawing Sheets

(51) Int. Cl.

| | |
|---|---|
| ***F16M 11/20*** | (2006.01) |
| ***G03B 17/56*** | (2006.01) |
| ***F16M 11/28*** | (2006.01) |

(56) References Cited

U.S. PATENT DOCUMENTS

| | | | | | |
|---|---|---|---|---|---|
| 2,580,350 | A * | 12/1951 | Friedberg | 403/90 | |
| 3,143,365 | A * | 8/1964 | Egger | 403/77 | |
| 3,191,212 | A | 6/1965 | Reiss, Sr. et al. | | |
| 3,319,982 | A * | 5/1967 | Schwartz | F16C 11/106 | 277/507 |
| 3,335,989 | A | 8/1967 | Bachmann | | |
| 3,575,369 | A | 4/1971 | Tetlow | | |
| 4,974,802 | A * | 12/1990 | Hendren | F16C 11/106 | 248/181.1 |
| 7,300,028 | B2 * | 11/2007 | Vogt | 403/90 | |
| 7,669,341 | B1 * | 3/2010 | Carazo | 33/293 | |
| 7,993,069 | B2 * | 8/2011 | Persson | 403/56 | |
| 2005/0001116 | A1 | 1/2005 | Vogt | | |
| 2008/0087783 | A1 * | 4/2008 | Istas | F16M 11/14 | 248/288.11 |
| 2009/0084912 | A1 | 4/2009 | Speggiorin | | |
| 2010/0127151 | A1 * | 5/2010 | Lillienskjold et al. | 248/677 | |
| 2012/0042730 | A1 * | 2/2012 | Johnson et al. | 73/579 | |
| 2013/0028656 | A1 * | 1/2013 | Lu | F16B 7/1463 | 403/109.1 |
| 2013/0264450 | A1 * | 10/2013 | Bigeh | 248/288.31 | |

OTHER PUBLICATIONS

English translation of a Search Report dated Nov. 17, 2014, with a Written Opinion dated Nov. 21, 2014, issued by the Intellectual Property Office of Singapore (IPOS) in corresponding Singapore Patent Application No. SG-2013082185 (10 pages).

Benro VT1 Monopod Stand, May 22, 2013; http://www.benrokorea.co.kr/shop/goods/goods_view.php?&goodsno=314. (9 pages).

* cited by examiner

BALL JOINT ORIENTATION DEVICE APPLICABLE TO UNIPOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

Pursuant to 35 U.S.C. § 119 and the Paris Convention Treaty, this application claims the benefit of Chinese Patent Application No. 201310266409.3 filed on Jun. 28, 2013, the contents of which are incorporated herein by reference.

BACKGROUND OF THE INVENTION

1. Field of the Invention

The invention relates to a ball joint orientation device applicable to photographic equipment, in particular to a ball joint orientation device applicable to a unipod.

2. Background of the Invention

When video shooting is performed with photographic equipment, in order to reduce shaking of the photographic equipment in shooting and improve the video shooting quality, usually pods for faxing the photographic equipment are used to assist shooting, and in order to achieve all-direction shooting with the photographic equipment, people generally will choose to use pods with 360-degree rotation/swaying function; most pods implement 360-degree rotation/swaying of the photographic equipment through configuring ball joint rotation/swaying devices, the locking of which is generally achieved by applying a pressure in the direction of a sphere, while the unidirectional locking force is often not strong enough to ensure firmness, and thus the locking effect is not good.

To solve the above problem, a Chinese patent document CN201373969Y discloses a ball joint locking structure of a photography head, comprising a ball joint main body, a ball joint housing and a support seat, wherein the support seat is located in the ball joint housing; the ball joint main body is located between the support seat and the ball joint housing; the support seat can move in the axial direction of the ball joint housing under the action of an adjusting knob; inside the ball joint main body, a washer is sleeved on the ball joint main body, the inner surface of the washer being adapted to the outer surface of the ball joint main body, the washer being provided with a circle of recess outside, and two side surfaces of the recess being outward inclined surfaces; the ball joint housing is provided with a circle of bulge therein, the bulge being adapted to the recess of the washer; in the ball joint locking structure described in the above patent document, through tightly screwing the adjusting knob, the support seat bears an upward pressure, and in turn applies a pressure to the ball joint main body, and the ball joint main body at the same time applies a pressure to the washer; with the increase of the pressure on the support seat, the locking force on the ball joint main body also increases gradually; in the gradual increase process of the locking force, the two inclined surfaces of the outer-ring recess of the washer expand outward and deform, increasing the force bearing area of the ball joint main body and the washer, thereby increasing the locking force on the ball joint main body; and in the ball joint locking structure, the ball joint main body bears pressure simultaneously in the upper and lower directions, and the locking effect is better.

The ball joint locking structure described in the above patent document mainly has the following disadvantages: in the ball joint locking structure, the ball joint main body is in contact with both the washer and the support seat via its curved surface, and no matter the ball joint main body is in a rotating state or locking state, the lower end thereof is always in mutual contact with the support seat, such that in the rotating process of the ball joint main body, friction may occur between the lower end of the ball joint main body and the support seat, and after a period of use, the mutual contact curved surfaces thereof can be worn, so that the surfaces in mutual contact tend to become not smooth, which in turn results in that after the ball joint locking structure is locked, the ball joint main body cannot fully fit the support seat, clearances exist therebetween, and the locking is not firm, so that the ball joint main body is likely to shake or incline at a certain angle under the gravity action of a device connected to the upper end of the ball joint main body and in the case of touch with an external force, thereby affecting the photographing/shooting effect of the photographic equipment or leading to inaccurate photographing/shooting angle or poor reliability.

SUMMARY OF INVENTION

To this end, it is one technical problem of the invention that in the ball joint locking structure of the prior art, mutual friction between the ball joint and the locking component results in wear, so that the locking is not firm, and further a firmly lockable ball joint orientation device applicable to a unipod is provided.

In view of the above-described problem, it is one objective of the invention to provide a ball joint orientation device applicable to the unipod of the invention comprising a ball joint, stop members, a ball joint seat, and a main rod, wherein, one end of the ball joint is formed as a rotating part and is arranged in a ball joint seat in a universal swaying manner, and the other end extends to form a connecting part and is fixedly connected with a main rod; the stop members are arranged in the ball joint seat, and the stop members include a locking stop member located at an upper side of the rotating part; said device further comprises an orientation knob sleeved around the connecting part and/or the main rod, and the orientation knob can be screwed towards or away from said ball joint seat, so as to move upward or downward; the orientation knob (3) abuts against an end face of said ball joint seat by being screwed towards the ball joint seat, and, the locking stop member locks the ball joint, so as to prevent the ball joint from rotating; and the orientation knob becomes separated from the ball joint seat by being screwed away from the ball joint seat, so as to release the ball joint and allow the ball joint to rotate freely.

In a class of this embodiment, the stop members further comprises a lower stop member adapted for limiting the position of the ball joint and located at a lower side of the rotating part, an upper surface of the lower stop member abuts against the rotating part.

In a class of this embodiment, the main rod is in threaded connection with the connecting part, and the orientation knob is in threaded connection with the main rod or the connecting part.

In a class of this embodiment, the main rod and the connecting part are fixedly connected together through a main rod joint, one end of the main rod joint is sleeved around the main rod and in threaded connection with one end of the main rod, and the other end of the main rod joint is sleeved around the connecting part and in threaded connection with the connecting part.

In a class of this embodiment, the orientation knob is sleeved around the main rod joint, and in threaded connection with the main rod joint.

In a class of this embodiment, the lower stop member is a ball joint lower stop ring made of plastic, and the ball joint lower stop ring is fixedly disposed in the ball joint seat.

In a class of this embodiment, the locking stop member (21) is a ball joint upper stop ring made of rubber, and the ball joint upper stop ring is disposed inside the ball joint seat (5) and located at the upper end of the ball joint seat (5), and the lower surface of the ball joint seat (5) abuts against a spherical surface of the rotating part (11).

In a class of this embodiment, the mutual contact surfaces of each of the ball joint upper and lower stop rings and the rotating part are curved surfaces.

In a class of this embodiment, recesses are respectively formed at both end ports of the inner wall of the orientation knob, and seal rings are respectively disposed in the recesses.

Advantages of the invention comprise:

(1) In the ball joint orientation device applicable to the unipod of the invention, the locking of the ball joint is achieved by mutual cooperation of the three components, the orientation knob, the ball joint seat and the locking stop member, i.e., with the abutting of the orientation knob against the ball joint seat, an upward force is generated for the ball joint, so that the ball joint and the locking stop member are coupled with each other, thereby achieving the locking of the ball joint, and avoiding mutual friction between the ball joint and a locking device, so as to achieve a firm locking effect.

(2) In the ball joint orientation device applicable to the unipod of the invention, recesses are respectively formed at both end ports of the inner wall of the orientation knob, and seal rings are respectively disposed in the recesses; so that the seal rings can prevent sand or dust from entering the clearances between the orientation knob and the main rod or the main rod joint, thereby ensuring smooth rotation of the orientation knob during use.

(3) In the ball joint orientation device applicable to the unipod of the invention, the stop members also include the lower stop member located at the lower side of the rotating part, and the lower stop member can limit the ball joint within a certain space of the ball joint seat, and prevent the ball joint from sliding up and down along the axial direction of the ball joint seat after the ball joint is unlocked, so that the swaying of the ball joint in the ball joint seat is more flexible and smooth.

(4) In the ball joint orientation device applicable to the unipod of the invention, the ball joint upper stop ring and the ball joint lower stop ring are made of plastic material, and the mutual contact surfaces of each of the ball joint upper and lower stop rings and the ball joint are curved surfaces, such that when being locked, the ball joint can be in close fit with the ball joint upper stop ring, and when being rotated, the ball joint can be in close fit with the curved surface of the ball joint lower stop ring, and can be smoothly rotated; and when the ball joint is locked, the ball joint tightly fits to the ball joint upper stop ring, the friction is relatively large, and the ball joint can not rotate after being locked, so high locking reliability of the orientation device can be achieved.

BRIEF DESCRIPTION OF THE DRAWINGS

Detailed description will be given below in conjunction with accompanying drawings.

Figure 1:
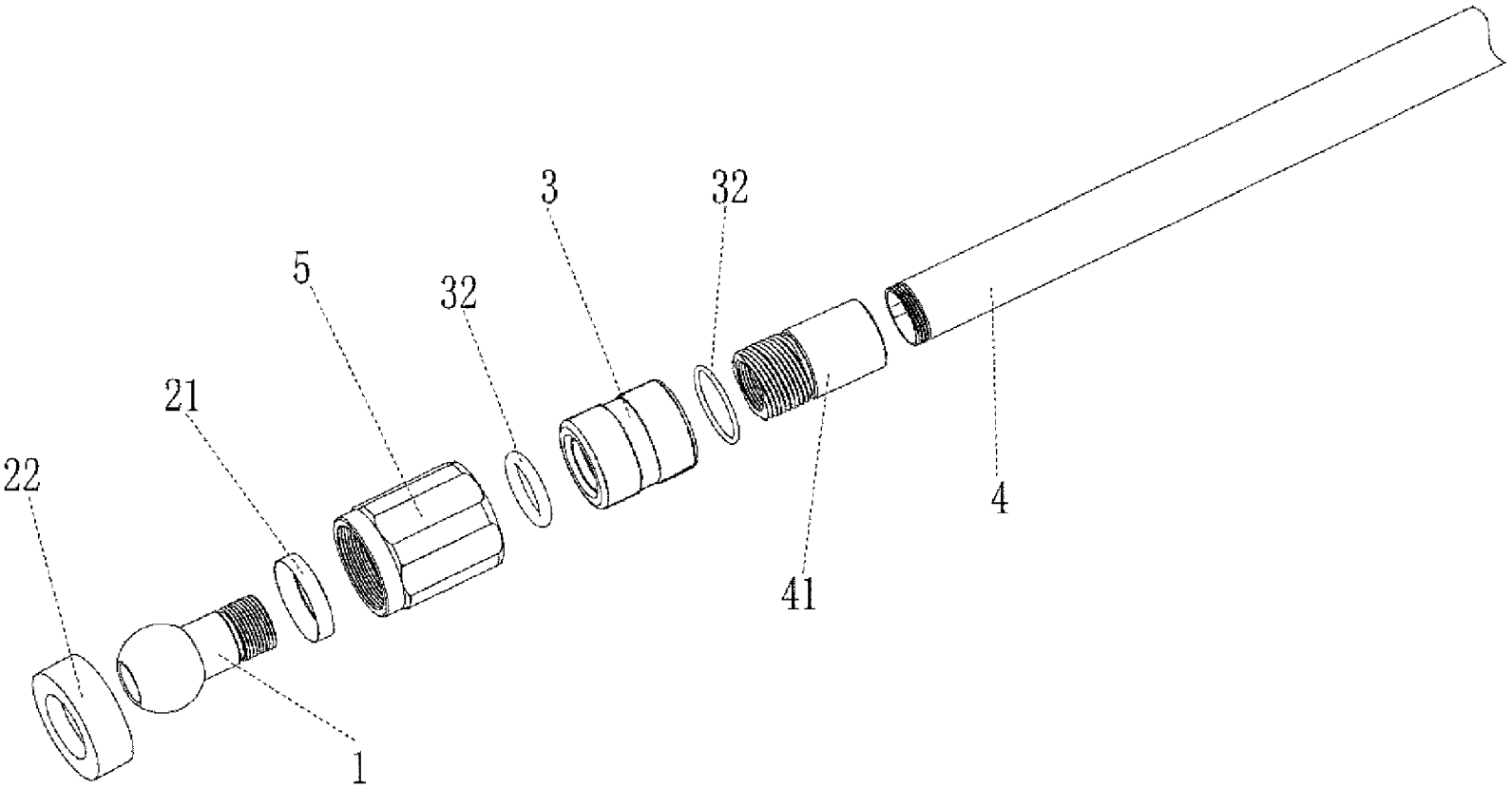
FIG. 1 is an exploded view of a ball joint orientation device of the invention.

Reference numerals in the figures are as follows: 1—ball joint; 11—rotating part; 12—connecting part; 21—locking stop member; 22—lower stop member; 3—orientation knob; 31—recess; 32—seal ring; 4—main rod; 41—main rod joint; and 5—ball joint seat.

DETAILED DESCRIPTION OF THE EMBODIMENTS

The invention will be further discussed below using the following embodiments in conjunction with the drawings.

Figure 2:
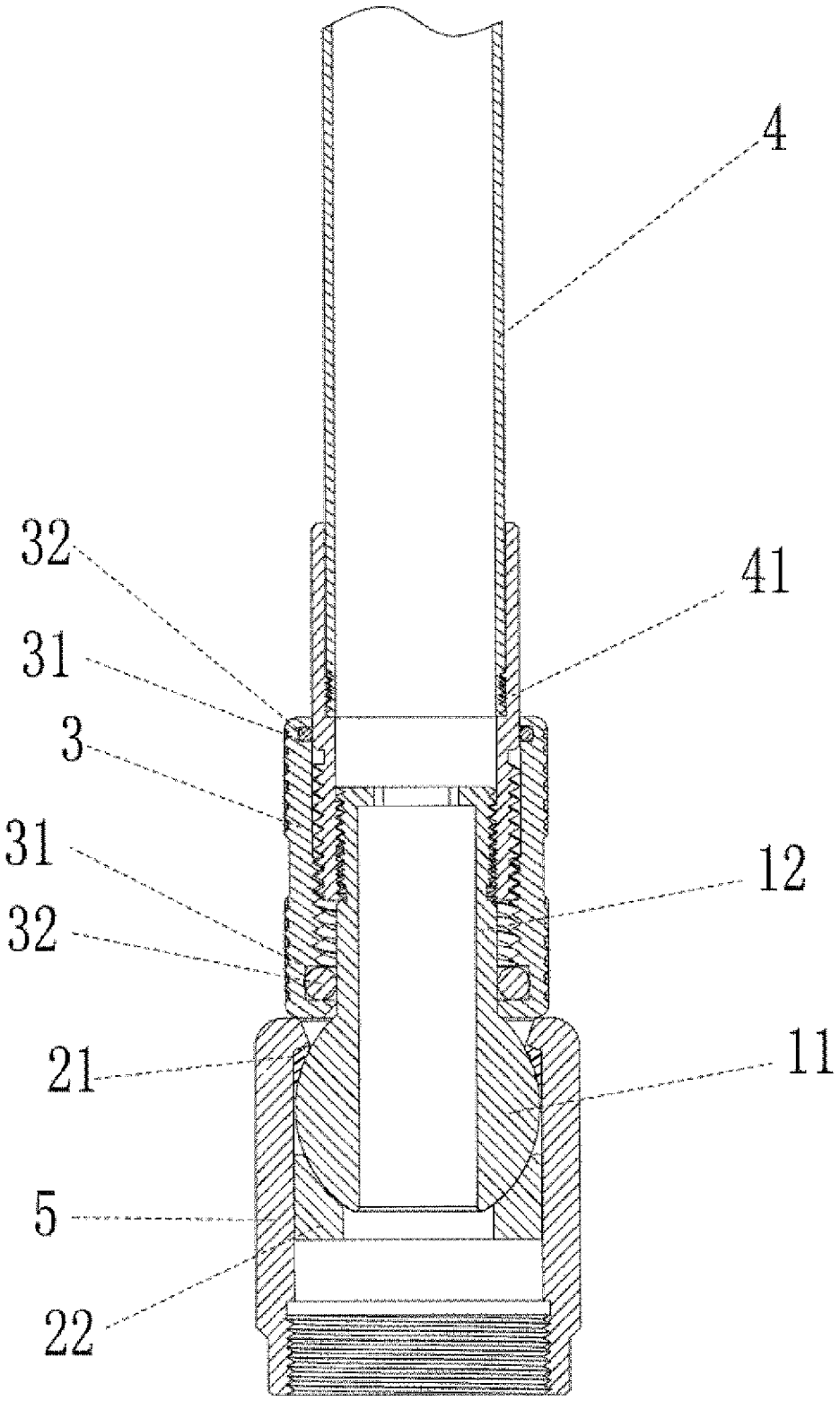
FIG. 2 is a structural schematic view of the ball joint orientation device of the invention in its locked state.
Figure 3:
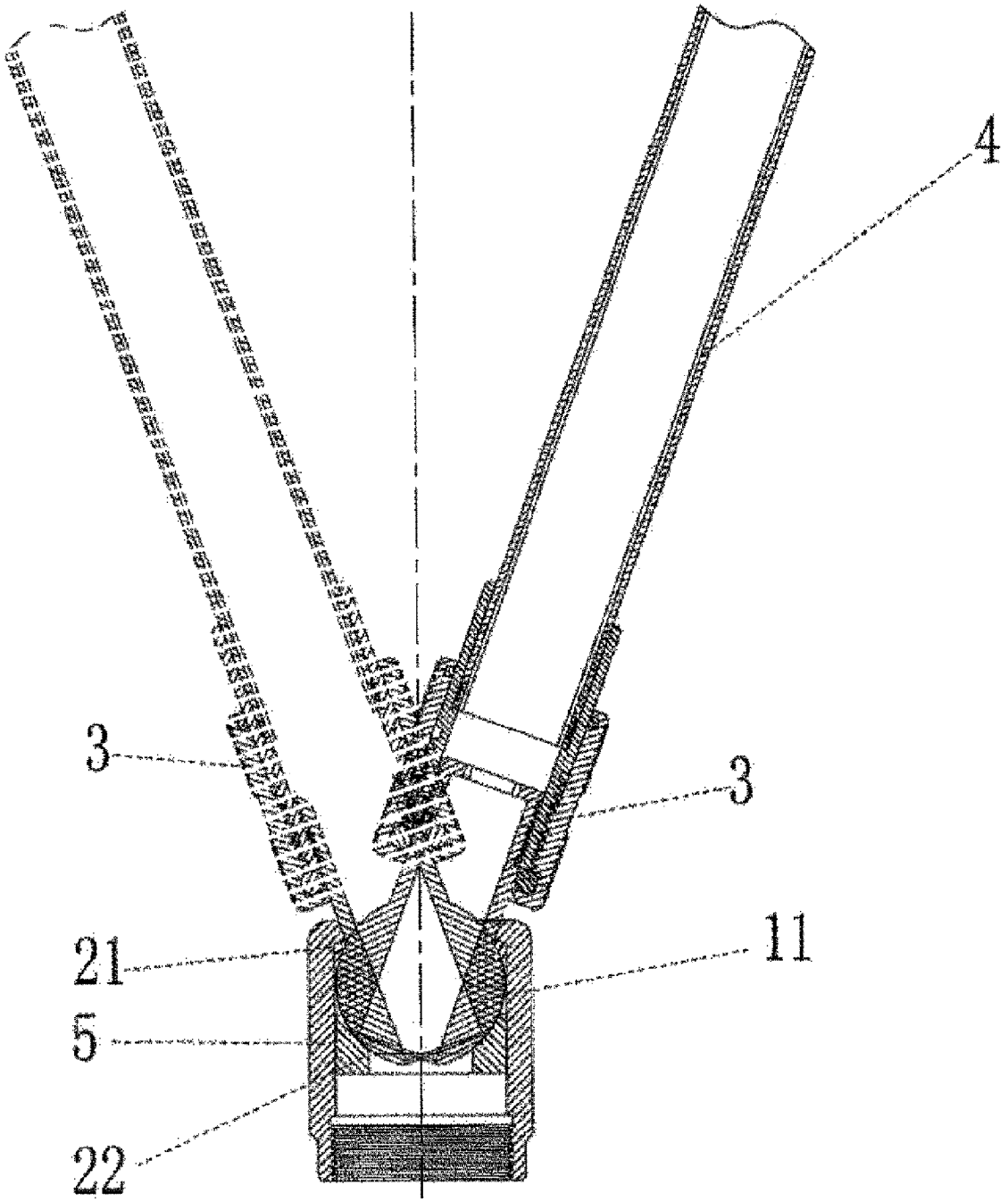
FIG. 3 is a structural schematic view of the ball joint orientation device of the invention in its unlocked state.
Figure 4:
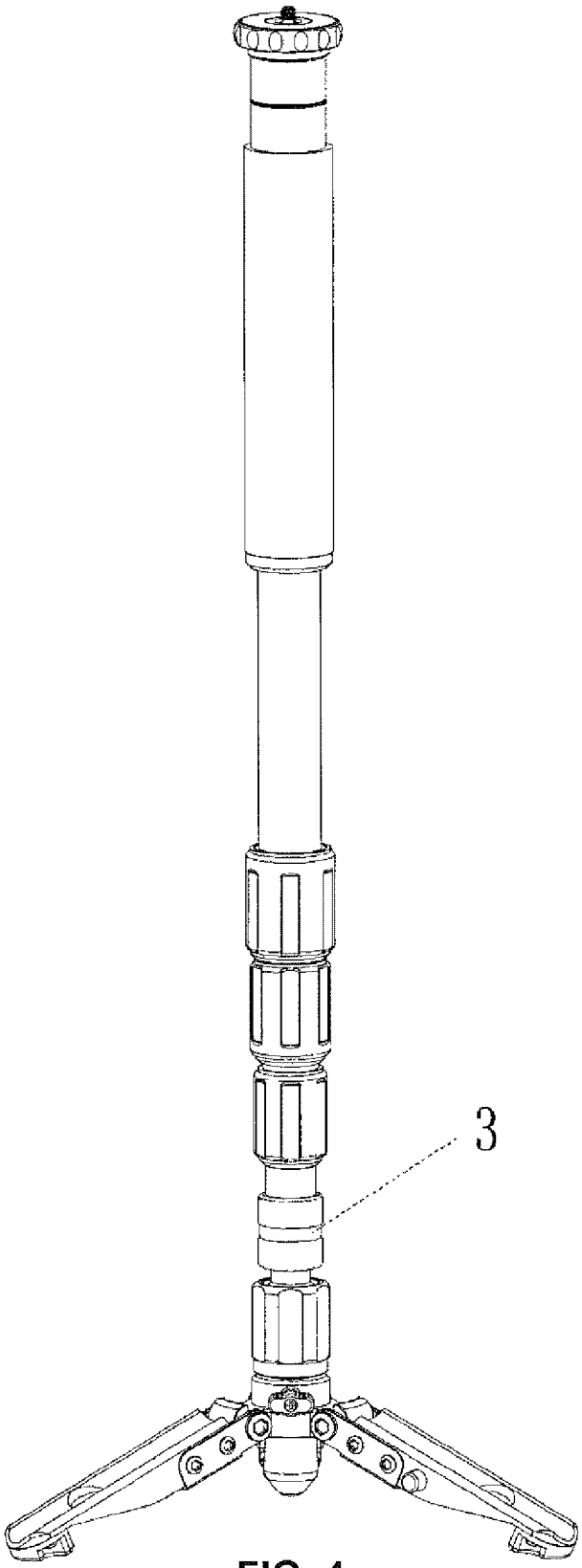
FIG. 4 is a structural schematic view of the ball joint positioning device of the invention when it is used in combination with a unipod.

As shown in FIGS. 1-4, a ball joint orientation device applicable to a unipod of one embodiment of the invention comprises a ball joint 1, stop members, a ball joint seat 5, and a main rod 4, wherein, one end of the ball joint 1 is formed as a rotating part 11 and is arranged in a ball joint seat 5 in a universal swaying manner, and the other end extends to form a connecting part 12 and is fixedly connected with a main rod 4; the stop members are arranged in the ball joint seat 5, and the stop members comprise a locking stop member 21 located at an upper side of the rotating part 11; the device further comprises an orientation knob 3 sleeved around the connecting part 12 and/or the main rod 4, and the orientation knob 3 can be screwed towards or away from said ball joint seat 5, so as to move upward or downward; the orientation knob 3 is able to abut against an end face of the ball joint seat 5 by being screwed towards the ball joint seat 5, and, the locking stop member 21 locks the ball joint 1, so as to prevent the ball joint from rotating; and the orientation knob 3 becomes separated from the ball joint seat 5 by being screwed away from the ball joint seat 5, so as to release the ball joint 1 and allow the ball joint to rotate freely. In the invention, the locking of the ball joint 1 is achieved by mutual cooperation of the three components, i.e., the orientation knob 3, the end face of the ball joint seat 5 and the locking stop member 21, i.e., with the abutting of the orientation knob 3 against the ball joint seat 5, an upward pull force is generated for the ball joint 1, so that the ball joint 1 and the locking stop member 21 are coupled with each other, thereby achieving orienting locking of the ball joint 1, and avoiding mutual friction between the ball joint 1 and a locking device, so as to achieve a firm locking effect.

In the embodiment, the stop members may further comprise a lower stop member 22 located at the lower side of the rotating part 11, and the lower stop member 22 is able limit the ball joint 1 within a certain space of the ball joint seat 5, and prevent the ball joint 1 from sliding up and down along the axial direction of the ball joint seat 5 after the ball joint is unlocked, so that the swaying of the ball joint 1 in the ball joint seat 5 may be more flexible and smooth.

In a preferred embodiment, the main rod 4 and the connecting part 12 are fixedly connected through a main rod joint 41, one end of the main rod joint 41 being sleeved on the main rod 4 and in threaded connection with an end of the main rod 4, and the other end of the main rod joint 41 is sleeved around the connecting part 12 and in threaded connection with the connecting part 12. The orientation knob 3 is sleeved around the main rod joint 41, and in threaded connection with the main rod joint 41.

In an alternative embodiment, the main rod 4 is adapted for being directly in threaded connection with the connecting part 12, and the orientation knob 3 is adapted for being directly sleeved around the main rod 4 or the connecting part 12 and in threaded connection with the main rod 4 or the connecting part 12.

In the embodiment, recesses 31 are respectively formed at two end ports of the inner wall of the orientation knob 3, and seal rings 32 are respectively disposed in the recesses 31; and the seal rings 32 is adapted for preventing sand or dust from entering the clearances between the orientation knob 3 and the main rod 4 or between the orientation knob 3 and the main rod joint 41, thereby ensuring smooth rotation of the orientation knob 3 during use.

Further, in the embodiment, preferably the lower stop member 22 is a ball joint lower stop ring made of plastic, and the ball joint lower stop ring is fixedly disposed in ball joint seat 5, and the upper surface thereof abuts against the spherical surface of the rotating part 11; and the locking stop member 21 is a ball joint upper stop ring made of rubber, and the ball joint upper stop ring is disposed inside the ball joint seat 5 and located at the upper end of the ball joint seat 5, and the lower surface of the ball joint seat 5 abuts against a spherical surface of the rotating part 11.

In a preferred embodiment, the mutual contact surfaces of each of the ball joint upper and lower stop ring and the rotating part 11 are curved surfaces, such that when being locked, the ball joint 1 can be in close fit with the ball joint upper stop ring, and the locking is firm, and at the same time, when being rotated, the ball joint 1 can be in fit with the curved surface of the ball joint lower stop ring, and can rotate smoothly.

In an alternative embodiment of the locking stop member 21, the locking stop member 21 can also be designed in the form of a flange, which is formed by extension of an end face of the ball joint seat 5 toward the direction of the central axis, the inner diameter of the flange may be smaller than the diameter of the rotating part 11 of the ball joint 1 and larger than the diameter of the connecting part 12.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A ball joint orientation device applicable to a [unipod] *monopod*, comprising*:* a ball joint;

stop members;

a ball joint seat; and a main rod;

wherein, one end of said ball joint [is formed as] *comprises* a rotating part and is arranged in said ball joint seat in a universal swaying manner, and the other end *of said ball joint* extends to form a connecting part and is [fixedly] connected with said main rod;

said stop members [are] *being* arranged in said ball joint seat, and said stop members [comprise] *comprising* a locking stop member located at [an upper] *one* side of said rotating part*, wherein said locking stop member is a first ball joint stop ring and disposed at one end of said ball joint seat, and a surface of said ball joint seat abutting against a spherical surface of said rotating part*;

said stop members [further comprise] *comprising* a [lower] *first* stop member adapted for limiting a position of the ball joint and located at a [lower] *first* side of said rotating part, an upper surface of the [lower] *first* stop member abuts against the rotating part*, wherein said first stop member is a second ball joint stop ring disposed in the ball joint seat*;

[said device further comprises] an orientation knob sleeved around the connecting part [and/or said main rod] *via a threaded connection*, and said orientation knob [can be screwed] *being transitioned* towards or away from said ball joint seat[, so as to move upward or downward];

*wherein* said orientation knob [is able to abut] *abuts* against an end face of said ball joint seat by [being screwed] *moving* towards said ball joint seat, and, *wherein* said locking stop member locks said ball joint[, so as] to prevent said ball joint from rotating; [and]

*wherein* said orientation knob [becomes separated] *separates* from said ball joint seat [by being screwed] *in response to being transitioned* away from said ball joint seat[, so as] to release said ball joint and allow the ball joint [to rotate] *for rotating* freely, wherein said main rod and said connecting part are [fixedly] connected together through a main rod joint, one end of said main rod joint is sleeved around said main rod and in threaded connection with one end of said main rod, and the other end of said main rod joint is sleeved around said connecting part and in threaded connection with said connecting part[,]*; and*

[said orientation knob is sleeved around said main rod joint, and in threaded connection with said main rod joint or said connecting part, said lower stop member is a ball joint lower stop ring made of plastic, and the ball joint lower stop ring is fixed in ball joint seat, said locking stop member is a ball joint upper stop ring made of rubber, and the ball joint upper stop ring is disposed inside said ball joint seat and located at the upper end of said ball joint seat, and the lower surface of said ball joint seat abuts against a spherical surface of said rotating part,]

[the mutual contact surfaces of each of the ball joint upper and lower stop rings and the rotating part are curved surfaces] *wherein the first ball joint stop ring engages the rotating part and the second ball joint stop ring engages the rotating part*, wherein the locking stop member [is in the form of] *comprises* a flange formed by extension of the end face of the ball joint seat toward [the] *a* direction of [the] *a* central axis, *wherein said flange comprises* an inner diameter [of the flange is] *being* smaller than a diameter of the rotating part of the ball joint and [is] *being* larger than a diameter of the connecting part.

2. The ball joint orientation device of claim 1, wherein, recesses are respectively formed at both end ports of [the] *an* inner wall of the orientation knob, and seal rings are respectively disposed in said recesses.

*3. A ball joint orientation device applicable to a monopod, comprising*

*a ball joint; stop members; a ball joint seat; and a monopod body;*

*wherein, one end of said ball joint comprises a rotating part and is arranged in said ball joint seat in a universal swaying manner, and the other end of said ball joint extends to form a connecting part and is connected with said monopod body;*

*said stop members being arranged in said ball joint seat, and said stop members comprising a locking stop member located at one side of said rotating part, wherein said locking stop member is a first ball joint stop member and disposed at one end of said ball joint seat, and a surface of said ball joint seat abutting against a spherical surface of said rotating part;*

*said stop members comprising a first stop member adapted for limiting a position of the ball joint and located at a first side of said rotating part, an upper surface of the first stop member abuts against the rotating part, wherein said first stop member is a second ball joint stop member disposed in the ball joint seat;*

*an orientation knob sleeved around the connecting part via a threaded connection, and said orientation knob being transitioned towards or away from said ball joint seat;*

*wherein said orientation knob abuts against an end face of said ball joint seat by moving towards said ball joint seat, and, wherein said locking stop member locks said ball joint to limit said ball joint from rotating;*

*wherein said orientation knob separates from said ball joint seat in response to being transitioned away from said ball joint seat to release said ball joint for rotating freely;*

*wherein said monopod body and said connecting part are connected together through a monopod body joint, one end of said monopod body joint is sleeved around said monopod body and in threaded connection with one end of said monopod body, and the other end of said monopod body joint is sleeved around said connecting part and in threaded connection with said connecting part; and*

*wherein the first ball joint stop member engages the rotating part and the second ball joint stop member engages the rotating part, wherein the locking stop member comprises a flange formed by extension of the end face of the ball joint seat toward a direction of a central axis, wherein said flange comprises an inner diameter being smaller than a diameter of the rotating part of the ball joint and being larger than a diameter of the connecting part.*

*4. A ball joint orientation device applicable to a monopod comprising*

*a ball joint; stop members; a ball joint seat; and*

*a monopod body;*

*wherein one end of said ball joint comprises a rotating part and is disposed in said ball joint seat in a universal swaying manner, and the other end of said ball joint extends to form a connecting part;*

*said stop members being disposed in said ball joint seat, and said stop members comprising a locking stop member disposed at one side of said rotating part, wherein said locking stop member comprises a first ball joint stop ring and disposed at one end of said ball joint seat, and wherein a surface of said ball joint seat abutting against a spherical surface of said rotating part;*

*said stop members comprising a first stop member adapted for limiting a position of the ball joint and located at a first side of said rotating part, one surface of the first stop member abuts against the rotating part, wherein said first stop member is a second ball joint stop ring disposed in the ball joint seat;*

*an orientation knob sleeved around the connecting part, in response to a force applied thereto, wherein said orientation knob transitions toward or away from said ball joint seat;*

*wherein when one end of said orientation knob abuts against an end face of said ball joint seat by moving towards said ball joint seat, wherein said locking stop member locks said ball joint to limit said ball joint from rotating;*

*wherein said orientation knob separates from said ball joint seat in response to another force applied thereto to move away from said ball joint seat to release said ball joint for rotating freely;*

*wherein said monopod body and said connecting part are connected together through a monopod body joint, one end of said monopod body joint is in threaded connection with one end of said monopod body, and the other end of said monopod body joint is connected with said connecting part; and*

*wherein the first ball joint stop ring engages the rotating part and the second ball joint stop ring engages the rotating part, wherein the locking stop member comprises a flange formed by extension of the end face of the ball joint seat toward a direction of a central axis, wherein said flange comprises an inner diameter being smaller than a diameter of the rotating part of the ball joint and being larger than a diameter of the connecting part.*

* * * * *